United States Patent [19]

Flowers et al.

[11] Patent Number: 4,887,853
[45] Date of Patent: Dec. 19, 1989

[54] METHOD AND APPARATUS FOR PROVIDING A UNITARY ASSEMBLY OF TUBING AND A TERMINATING FITTING

[75] Inventors: Charles V. Flowers, Fairport; Bernard J. Sass, West Ontario, both of N.Y.

[73] Assignee: ITT Corporation, New York, N.Y.

[21] Appl. No.: 90,864

[22] Filed: Aug. 28, 1987

[51] Int. Cl.$^4$ .............................................. F16L 13/08
[52] U.S. Cl. ................. 285/287; 285/382.4; 29/523; 228/136
[58] Field of Search ............. 285/382.4, 382.5, 287, 285/286; 228/135, 136; 29/523

[56] References Cited

U.S. PATENT DOCUMENTS

| | | | |
|---|---|---|---|
| 1,794,849 | 3/1931 | Hagstedt | 285/382.4 X |
| 1,941,174 | 12/1933 | Jensen | 285/382.5 X |
| 2,166,078 | 7/1939 | Stephenson | 285/287 |
| 2,522,194 | 9/1950 | Richardson | . |
| 3,494,643 | 2/1970 | Longshaw et al. | . |
| 4,128,264 | 12/1978 | Oldford | 285/382.4 X |

FOREIGN PATENT DOCUMENTS

| | | | |
|---|---|---|---|
| 1022061 | 1/1958 | Fed. Rep. of Germany | ... 285/382.4 |
| 576544 | 4/1946 | United Kingdom | ............ 285/382.5 |

Primary Examiner—Dave W. Arola
Attorney, Agent, or Firm—Robert P. Seitter

[57] ABSTRACT

A unitary assembly of tubing and an end fitting. The end fitting comprises a threaded fastener fitting having a tubular bore extending therethrough. An undercut annular groove is coaxially provided in the wall portion of the tubular bore which is spaced apart from the end of the fitting. The opening of the tubular bore at the end of the fitting is provided with an undercut counterbore. The end of the tubing is inserted through the opening and into the tubular bore until it engages a stop formed by a reduced diameter portion of the tubular bore at the axially inward end of the undercut annular groove. A ball mandrel is inserted through the opening at the other end of the tubular bore to engage and force the end portion of the tube into the undercut annular groove. A braze ring is inserted into the undercut counterbore the latter of which allows a braze fillet to form during the brazing operation.

10 Claims, 1 Drawing Sheet 4,887,853

METHOD AND APPARATUS FOR PROVIDING A UNITARY ASSEMBLY OF TUBING AND A TERMINATING FITTING

BACKGROUND OF THE INVENTION

This invention relates to tubing connectors and, more particularly, to such connectors wherein the terminating fitting is brazed onto the associated tube.

Tubing connectors for threadless pipe, tubing, conduit and the like are known and have been widely used in the art. The tubes are mechanically connected by means of a threaded fitting which fits over an expansion on the tube end and are screwed together to clamp the expansion to the mating part. These known tubing connectors are exemplified by U.S. Pat. Nos. 2,522,194 and 3,494,643. These known tubing connectors have the disadvantage that they are susceptible to leaking because the mechanical connection compression-fitting relies upon merely clamping the expanded or flared tubing ends against the mating parts. Thus, if the screw fittings are loosened by vibration and the like, leaks can develop. Attempts have been made to braze the tubes onto the terminating fastener or fitting. However, these brazed connections suffer from the disadvantage that the brazing operation requires expensive fixturing and high brazing costs. Further, the brazed quality has been found to be inconsistent, particularly as a result of poor alignment between the tube and the fitting. The effect of these brazing problems also manifests itself by a relatively high percentage of voids in the brazed connection.

These and other disadvantages are overcome by the present invention wherein there is provided a unitary assembly of tubing and an end fitting. The assembly, in accordance with the present invention, virtually eliminates the need for fixturing and therefore reduces the brazing costs. Further, the structural configuration provides accurate alignment between the tube and fitting to further facilitate the brazing operation.

SUMMARY OF THE INVENTION

Briefly, a unitary assembly of tubing with a threaded terminating fastener is provided. A threaded fitting includes a tubular opening therein extending through the fitting along the longitudinal axis thereof. An annular groove is provided in a wall portion of the tubular opening which is spaced apart from a first end of the fitting. A tube is received within the opening of the fitting through the first end wherein an end portion of the tube extends across the groove. The end portion of the tube is expanded into the groove. The present invention further comprises a method for making the unitary assembly.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1b is an end view of the fitting of FIG. 1a;

DETAILED DESCRIPTION

Figure 1A:
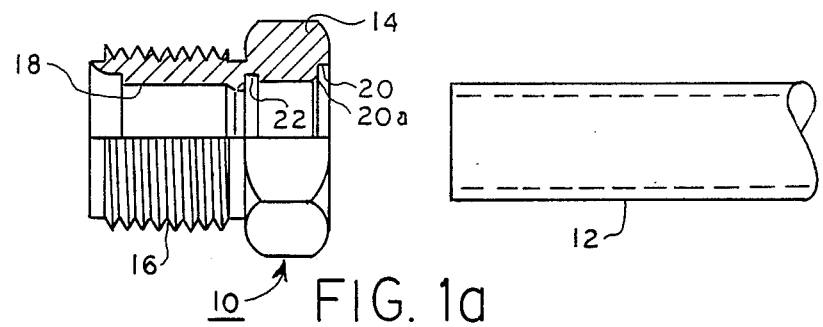
FIG. 1a is a side view, in partial section, of the tube and the terminating end fitting in accordance with the present invention.
Figure 1B:
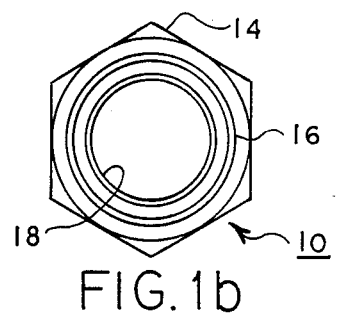
Figure 1C:
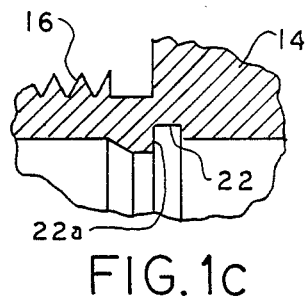
FIG. 1c is an enlarged fragmentary view of a portion of the fitting of FIG. 1a illustrating the undercut portion or groove provided in the opening of the terminating fitting; and, FIGS. 2-5 illustrate the method steps for providing an assembly of the tube and end fitting in accordance with the principles of the present invention.

Referring now to FIG. 1a there is shown generally at the terminating end fitting in accordance with the present invention adjacent to the associated tube 12. Terminating fitting 10 includes a hexagonal head portion 14 and a threaded connecting portion 16 which is joined with and coaxially extends away from head portion 14. The material of the end fitting and tube 12 may comprise any desired metallic material such as aluminum, copper, steel or the like. Fitting 10 includes a coaxial throughbore 18 extending from end to end thereof. Fitting 10 further includes an undercut or counterbore portion 20 at the outer end of head portion 14. Counterbore 20 receives a brazing ring and further facilitates the brazing operation as explained more fully hereinafter. Fitting 10 further includes an undercut groove or notch 22 in a wall portion of throughbore 18 which is spaced apart from the outer end of head portion 14. As best illustrated in FIG. 1c, annular groove 22 terminates at an axially inward and radially inward facing stop portion 22a. Referring again to FIG. 1a, the axially inner end portion of counterbore 20 is provided with a radius or chamfer 20a so as to facilitate the assembly of tube 12 with fitting 10, as will be explained more fully hereinafter.

Figure 2:
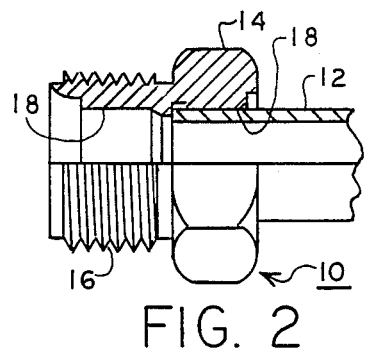
Figure 3:
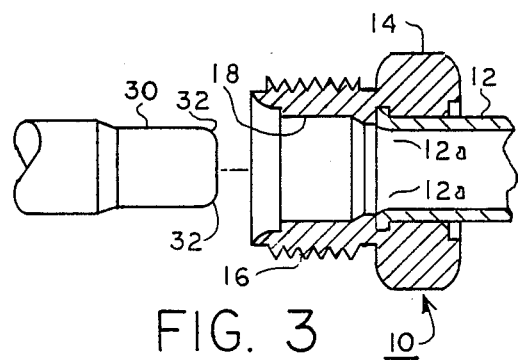

Referring now to FIGS. 2-5, there are shown four side views of fitting 10 and tube 12 and which illustrate the method of making the unitary assembly in accordance with the teachings of the present invention. Referring now specifically to FIG. 2, there is shown a side view in partial section of the initial assembly of tube 12 with fitting 10. The inside diameter of throughbore 18 closely approximates the outside diameter of tube 12 to provide a tight fit between those members to thereby provide a clinching effect when tube 12 is inserted into throughbore 18. The assembly is facilitated by the chamfer 20a at the axially inner terminating point of counterbore 20. This near zero clearance relationship provides a relatively rigid engagement of tube 12 with terminating fitting 10 during the subsequent processing and thereby eliminates the need for expensive fixturing as has been a problem in the prior art. It can be seen that once tube 12 passes chamfer 20a, it is inserted further into throughbore 18 until the end of tube 12 engages the radially inwardly directed projection or stop 22a at the axially inward end of undercut groove 22. Referring now to FIG. 3 there is shown the next step in the method for manufacturing the unitary assembly in accordance with the present invention. It can be seen that a ball mandrel 30 is inserted into fitting 10 and throughbore 18 at the other or axially inward end opening of throughbore 18. Ball mandrel 30 is provided with a curved radius 32 at its circumferential end portion. Ball mandrel 32 is inserted into throughbore 18 until radius 32 circumferentially engages the end portions of tube 12. Ball mandrel 30 is then advanced to expand and force the end portions of tube 12 into undercut groove 22 as illustrated at end portions 12a of tube 12. It can be seen that this step in the operation provides a smooth transitional area between the bore of tube 12 and the axially inner end portion of throughbore 18. Further, the expansion of tube end portions 12a into undercut annular groove 22 provides a rigid connection between fitting 10 and tube 12 as will be appreciated by those skilled in the art. That is, this step provides a positive lock-up of tube 12 with fitting 10.

Figure 4:
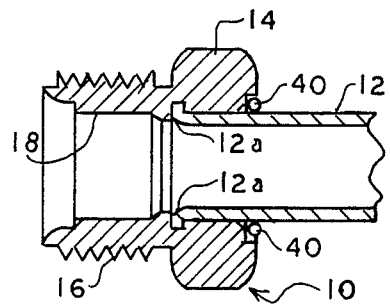
Figure 5:
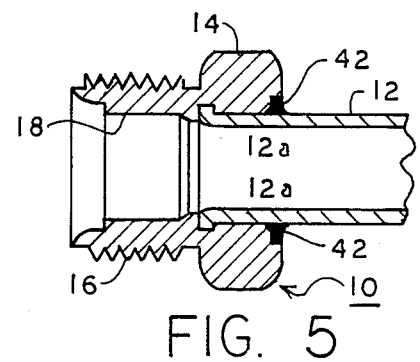

Referring now to FIG. 4 it can be seen that the next step places a braze ring 40 into counterbore 20. In currently preferred practice, braze ring 40 takes the form of a split O-ring which facilitates the placement of braze ring 40 onto tube 12 and into counterbore 20. As illustrated in FIG. 5, it can be seen that tube 12 is brazed onto fitting 10 and thereby provides a smooth fillet 42 between the outer wall of tube 12 and the end of head portion 14 of fitting 10. This smooth transitional fillet avoids stress concentrations at the connection of tube 12 to fitting 10 as will be appreciated by those skilled in the art. It will also be appreciated by those skilled in the art that since the rigid initial connection of tube 12 with fitting 14, as providing by the clinching-like effect during the initial assembly and the flow of end portions 12a into groove 22, eliminates the need for placing the initially connected assembly into a brazing fixture. Since the brazing fixture is eliminated, the undesired heat sinking effect occasioned by a brazing fixture is also avoided. Accordingly, the resulting brazing connection is more reliably provided.

What has been taught, then, is a method and apparatus for providing a unitary assembly of tubing and a terminating fitting facilitating, notably, a braze-on nut fitting and which overcomes the disadvantages of the prior art. It will be appreciated by those skilled in the art, that the present invention provides consistency and reliability of the completed connection heretofore deemed unattainable. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A method for forming a unitary assembly of tubing with a threaded terminating fastener, said method comprising the steps of:
   providing a threaded fitting having a tubular opening therein extending through said fitting along the longitudinal axis thereof;
   providing an annular groove in a wall portion of said tubular opening which is spaced apart from a first end of said fitting;
   providing a stop shoulder at the inner end of said annular groove to limit the insertion of a tube into said opening said stop shoulder having an inner diameter less than the inner diameter of any portion of said tubular opening
   inserting said tube into said opening of said fitting through said first end wherein at end portion of said tube extends across said groove;
   inserting a mandrel into the other end of said fitting into engagement with said end portion of said tube; and,
   forcing the end portion of said tube into said groove to provide a substantially continuous transitional area between the bore of said tube, said stop shoulder and the adjacent wall portion of said tubular opening.

2. The method according to claim 1, including the step of brazing an intermediate portion of said tube to said fitting at said first end of said fitting.

3. The method according to claim 2, wherein said brazing step forms a continuous fillet which encircles and bonds said tube to said fitting at said first end of said fitting.

4. The method according to claim 2, including the step of providing an undercut groove in said tubular opening at said first end prior to said brazing step and wherein said undercut groove extends a predetermined distance into said fitting.

5. A unitary assembly of tubing with a threaded terminating fastener, said assembly comprising, in combination:
   a threaded fitting having a tubular opening therein extending through said fitting along the longitudinal axis thereof;
   an annular groove in a wall portion of said tubular opening which is spaced apart from a first end of said fitting;
   a tube inserted into said opening of said fitting through said first end wherein an end portion of said tube extends across said groove;
   a stop shoulder adjacent to the longitudinally inner end of said annular groove to limit insertion of said tube into said opening; and, said stop shoulder having an inner diameter less than the inner diameter of any portion of said tubular opening;
   wherein the end portion of said tube is expanded into said groove and provides a substantially continuous transitional area between the bore of said tube, said stop shoulder and the adjacent wall portion of said tubular opening.

6. The assembly according to claim 5, wherein an intermediate portion of said tube is brazed onto said fitting at said first end of said fitting.

7. The assembly according to claim 6, wherein the brazed portion forms a continuous fillet which encircles and bonds said tube to said fitting at said first end of said fitting.

8. The assembly according to claim 6, wherein an undercut groove is provided in said tubular opening at said first end prior to the brazing of said brazed portion and wherein said undercut groove extends a predetermined distance into said fitting.

9. A fitting comprising a head portion formed with a polygonal external shape, said head portion having a through bore and a pair of end faces, said fitting further comprising a tubular connecting portion having a through bore, said tubular connecting portion extending from one end face of said head portion with the through bores being axially aligned, a stop shoulder formed on the tubular connecting portion and extending into its through bore adjacent said one end face of said head portion, said stop shoulder having an inner diameter less than the inner diameter of any portion of said through bores, an undercut groove formed in the through bore of said head portion immediately adjacent said stop shoulder, and a counter bore formed in the other end face of said head portion and a chamfer formed at the intersection of said counter bore and the through bore of said head portion.

10. A fitting in accordance with claim 9 wherein the outer surface of said tubular connection portion is threaded.

* * * * *